ively bowed annular side plate 7 integrally produced therewith and disposed substantially perpendicular thereto, the outer edge of the plate being formed with# UNITED STATES PATENT OFFICE.

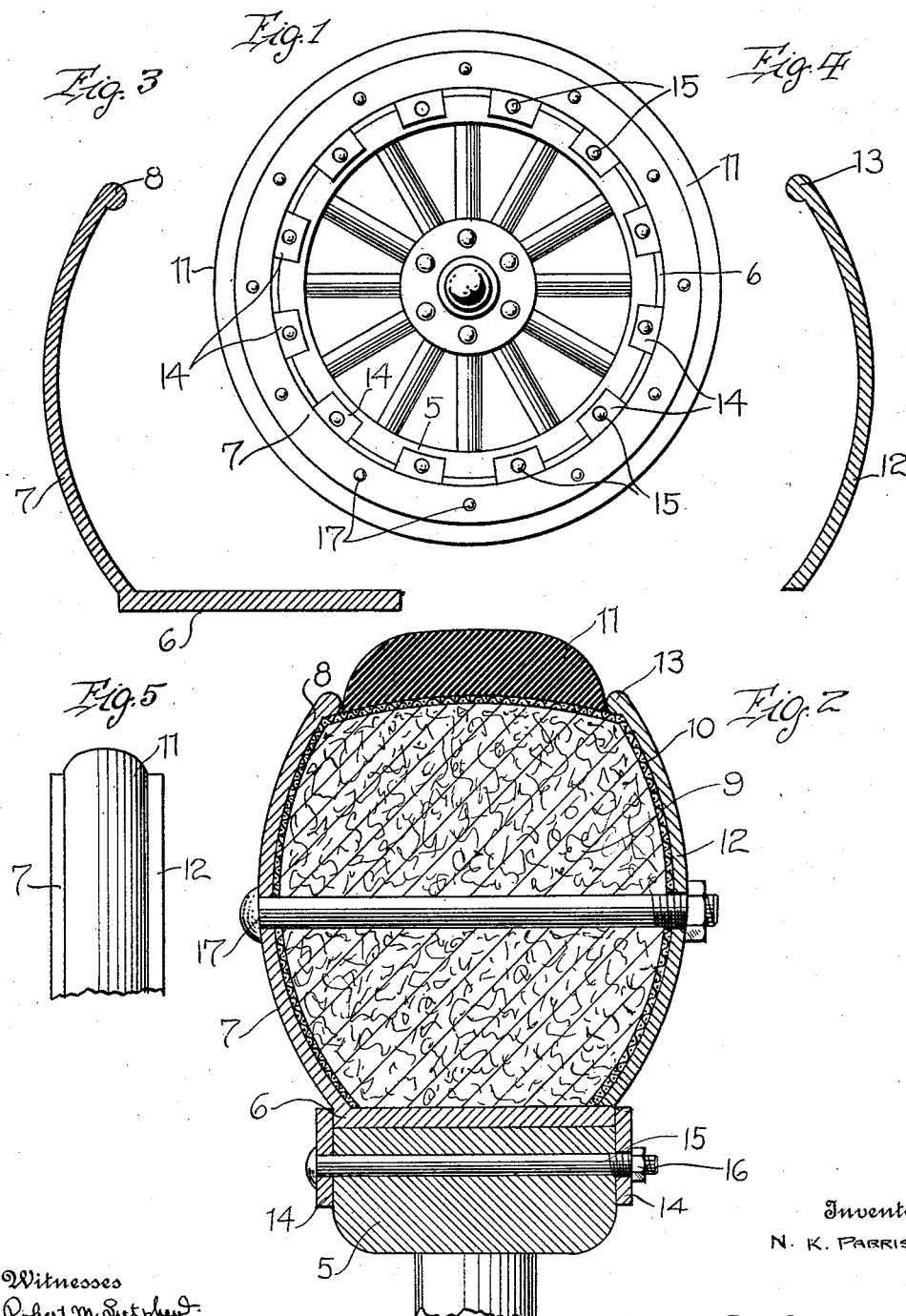

NATHANIEL K. PARRISH, OF GAINESVILLE, FLORIDA.

CUSHION-TIRE.

1,082,647. Specification of Letters Patent. Patented Dec. 30, 1913.

Application filed June 20, 1913. Serial No. 774,892.

*To all whom it may concern:*

Be it known that I, NATHANIEL K. PARRISH, a citizen of the United States, residing at Gainesville, in the county of Alachua and State of Florida, have invented certain new and useful Improvements in Cushion-Tires, of which the following is a specification, reference being had to the accompanying drawings.

This invention relates to improvements in vehicle tires, and more particularly to that class of tires which are designated as cushion tires.

An object of this invention is the provision of a tire in which no air spaces are provided, whereby punctures or blow outs are eliminated.

Another object of this invention is the provision of a tire comprising an outer tread member of rubber, and an inner cushioning member of cotton, wool, or other similar fibrous material, the tread member and cushioning member being detachably connected to the rim of a wheel, whereby the outer tread member may be readily replaced when worn or damaged.

A still further object of this invention is the provision of a tire comprising an outer tread member of rubber, and an inner cushioning member of fibrous material, the inner cushioning member having a covering of fabric, whereby the outer tread member of rubber may be vulcanized to the fabric to connect the tread member and cushioning member together.

With these and other objects in view, my invention consists in the novel construction, combination and arrangement of parts, to be hereinafter more fully described, claimed and illustrated in the accompanying drawing, in which—

Figure 1 is a side elevation of a wheel equipped with a tire constructed in accordance with my invention. Fig. 2 is an enlarged transverse sectional view through the rim and tire. Figs. 3 and 4 are detail sectional views. Fig. 5 is a fragmentary plan or top view.

Referring more particularly to the drawing, the numeral 5 designates the rim of a wheel on which an annular ring 6 is mounted, one edge of the ring having a transversely bowed annular side plate 7 integrally produced therewith and disposed substantially perpendicular thereto, the outer edge of the plate being formed with an inwardly extending bead or flange 8. The ring 6 extends entirely across the rim 5, and disposed upon the outer face of the ring is an annular cushioning member 9 of suitable fibrous material which is substantially rectangular in cross section, the side faces and outer faces of the cushioning member being slightly convex in form. The cushioning member 9 being provided with a covering 10 of canvas or other suitable fabric and an annular outer tread member 11 is disposed upon the outer face of the member 9. The tread member 11 is preferably composed of rubber, whereby it may be vulcanized to the canvas covering 10 of the inner member, so that the tread member 11 and the cushioning member 9 are rigidly connected together. The side plate 7 of the metallic ring 6 bears upon one side of the cushioning member 9, and arranged to bear against the opposite side face of the cushioning member is an annular side plate 12, the inner end of which rests upon the free edge of the ring 6, the outer edge of the plate 12 being also provided with an inwardly extending bead or flange 13.

To securely maintain the tire in place upon the rim, clamping plates 14 are arranged upon the opposite faces of the rim at intervals along its circumference, one edge of each clamping plate 14 projecting outwardly of the periphery of the rim, whereby the plates bear against the opposite edges of the ring 6. The clamping plates are maintained in position by bolts 15 which extend through the plates and through the rim of the wheel, and are secured thereto by nuts 16 which are threaded upon the free ends of the bolts. To prevent the side plate 12 from spreading, a plurality of bolts 17 are disposed through the plates 7 and 12 at substantially their transverse centers intermediate of their opposite edges, the bolts also passing through the cushioning member 9 to prevent the same from moving circumferentially of the wheel. It will be seen in Fig. 2 of the drawing, that the tread member 11 is of relatively less width than the cushioning member 9, and the flanges or beads 8 and 13 on the side plates 7 and 12 respectively bear against the opposite side faces of the tread member 11 to maintain the same in its position with relation to the cushioning member.

From the above description taken in connection with the accompanying drawing, it will be seen that my improved cushion tire will not be subject to punctures or blow outs, and will therefore be an effective substitute for a pneumatic tire. It will of course be understood that it is not necessary to vulcanize the tread member 11 to the cushioning member 9, as the beads 8 and 13 will maintain the same in its position, and that when one tread member 11 is worn and unfit for use it may be readily replaced with a new one.

What I claim is:

A tire structure comprising an annular rim adapted to surround the felly of a wheel and having produced adjacent one marginal portion and disposed substantially perpendicular thereto the outwardly bowed flange, the periphery of the rim from the flange thereof to its free margin being unobstructed, an annular outwardly bowed detachable flange removably insertible over the rim and positioned adjacent the free marginal portion thereof and capable of movement relatively to the stationary flange substantially across the entire width of the rim, an annular compressible cushioning member surrounding the rim and interposed between the flanges and adapted to be engaged thereby, an annular tread member carried by the cushioning member and positioned between the flanges and projecting therebeyond, and retaining means positioned at intervals and extending through the flanges and the cushioning member at substantially the transverse centers thereof such retaining means being operable to create the requisite clamping engagement of the flanges with the cushioning member.

In testimony whereof I hereunto affix my signature in the presence of two witnesses.

NATHANIEL K. PARRISH.

Witnesses:
GARRARD HARRELL,
ROBT. T. BERRY.

---

Copies of this patent may be obtained for five cents each, by addressing the "Commissioner of Patents, Washington, D. C."